United States Patent
Celis et al.

(10) Patent No.: US 9,235,531 B2
(45) Date of Patent: Jan. 12, 2016

(54) MULTI-LEVEL BUFFER POOL EXTENSIONS

(75) Inventors: Pedro Celis, Redmond, WA (US); Dexter Paul Bradshaw, Duvall, WA (US); Sadashivan Krishnamurthy, Redmond, WA (US); Georgiy I. Reynya, Redmond, WA (US); Chengliang Zhang, Sammamish, WA (US); Hanumantha Rao Kodavalla, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/305,670

(22) Filed: Nov. 28, 2011

(65) Prior Publication Data

US 2012/0072652 A1    Mar. 22, 2012

Related U.S. Application Data

(63) Continuation-in-part of application No. 12/717,139, filed on Mar. 4, 2010.

(60) Provisional application No. 61/497,420, filed on Jun. 15, 2011.

(51) Int. Cl.
  *G06F 12/00*  (2006.01)
  *G06F 12/12*  (2006.01)
  (Continued)

(52) U.S. Cl.
  CPC ............ *G06F 12/121* (2013.01); *G06F 8/4442* (2013.01); *G06F 12/0893* (2013.01); *G06F 12/08* (2013.01); *G06F 12/0866* (2013.01); *G06F 12/0897* (2013.01); *G06F 12/12* (2013.01)

(58) Field of Classification Search
  CPC ... G06F 12/0866; G06F 12/08; G06F 8/4442; G06F 12/0893; G06F 12/12
  See application file for complete search history.

(56) References Cited

U.S. PATENT DOCUMENTS 5,680,573 A    10/1997  Rubin et al.
5,829,038 A *  10/1998  Merrell et al. ................. 711/143
(Continued)

FOREIGN PATENT DOCUMENTS

CN    101320353    1/2008
CN    101101563    12/2008
(Continued)

OTHER PUBLICATIONS

Bishwaranjan Bhattacharjee et al., Enhancing Recovery Using an SSD Buffer Pool Extension—Published Date: Jun. 13, 2011, Proceedings: Seventh International Workshop on Data Management on New Hardware, pp. 10-16 http://www.cse.ust.hk/damon2011/damon2011_proceedings.pdf.
(Continued)

*Primary Examiner* — Charles Rones
*Assistant Examiner* — Tian-Pong Chang
(74) *Attorney, Agent, or Firm* — Brian Haslam; Raghu Chinagudabha; Micky Minhas

(57) ABSTRACT

A buffer manager that manages blocks of memory amongst multiple levels of buffer pools. For instance, there may be a first level buffer pool for blocks in first level memory, and a second level buffer pool for blocks in second level memory. The first level buffer pool evicts blocks to the second level buffer pool if the blocks are not used above a first threshold level. The second level buffer pool evicts blocks to a yet lower level if they have not used above a second threshold level. The first level memory may be dynamic random access memory, whereas the second level memory may be storage class memory, such as a solid state disk. By using such a storage class memory, the working block set of the buffer manager may be increased without resorting to lower efficiency random block access from yet lower level memory such as disk.

18 Claims, 10 Drawing Sheets

(51) Int. Cl.
*G06F 9/45* (2006.01)
*G06F 12/08* (2006.01)

(56) References Cited

U.S. PATENT DOCUMENTS

| | | | |
|---|---|---|---|
| 5,897,634 | A | 4/1999 | Attaluri et al. |
| 5,940,823 | A | 8/1999 | Schreiber et al. |
| 6,643,640 | B1 | 11/2003 | Getchius et al. |
| 6,754,662 | B1 | 6/2004 | Li |
| 6,826,615 | B2 | 11/2004 | Barrall et al. |
| 6,910,106 | B2 | 6/2005 | Sechrest et al. |
| 7,330,933 | B2 | 2/2008 | Crick |
| 7,689,607 | B2 | 3/2010 | Oks et al. |
| 7,962,693 | B1 | 6/2011 | Bumbulis |
| 8,010,747 | B2 | 8/2011 | van Riel |
| 8,145,859 | B2 | 3/2012 | Park et al. |
| 8,161,241 | B2 | 4/2012 | Bhattacharjee et al. |
| 8,250,111 | B2 | 8/2012 | Huras et al. |
| 8,335,893 | B2 | 12/2012 | Tagawa |
| 8,375,178 | B2 | 2/2013 | Rana et al. |
| 8,438,337 | B1* | 5/2013 | Garg et al. ............ 711/121 |
| 8,549,528 | B2 | 10/2013 | Nakajima et al. |
| 8,619,452 | B2 | 12/2013 | Rajan et al. |
| 8,863,091 | B2 | 10/2014 | Dageville et al. |
| 8,914,567 | B2 | 12/2014 | Miroshnichenko et al. |
| 2002/0013887 | A1 | 1/2002 | Ting |
| 2004/0078541 | A1 | 4/2004 | Lightstone et al. |
| 2004/0205297 | A1* | 10/2004 | Bearden ............ 711/133 |
| 2005/0005080 | A1* | 1/2005 | Dunshea et al. ........ 711/159 |
| 2005/0262059 | A1 | 11/2005 | White |
| 2007/0083716 | A1* | 4/2007 | Rajamony et al. ........ 711/141 |
| 2007/0094450 | A1* | 4/2007 | VanderWiel ............ 711/133 |
| 2008/0059707 | A1* | 3/2008 | Makineni et al. ........ 711/122 |
| 2008/0147974 | A1* | 6/2008 | Madison et al. ........ 711/118 |
| 2008/0244370 | A1* | 10/2008 | Lam ............ 714/803 |
| 2008/0270738 | A1* | 10/2008 | Makphaibulchoke et al. ............ 711/205 |
| 2009/0024800 | A1* | 1/2009 | Flemming et al. ........ 711/133 |
| 2009/0055591 | A1* | 2/2009 | Miwa et al. ............ 711/122 |
| 2009/0177667 | A1 | 7/2009 | Ramos et al. |
| 2009/0210445 | A1 | 8/2009 | Draese et al. |
| 2010/0153649 | A1* | 6/2010 | Li et al. ............ 711/130 |
| 2011/0066808 | A1 | 3/2011 | Flynn et al. |
| 2014/0195750 | A1 | 7/2014 | Zhang |

FOREIGN PATENT DOCUMENTS

| | | |
|---|---|---|
| JP | H08153014 | 6/1996 |
| JP | H08235042 | 9/1996 |
| JP | 2001282617 | 10/2001 |
| JP | 2003216460 | 7/2003 |
| JP | 2005173637 | 6/2005 |
| JP | 2005539309 | 12/2005 |
| JP | 2006185169 | 7/2006 |

OTHER PUBLICATIONS

Mustafa Canim et al., SSD Bufferpool Extensions for Database Systems—Published Date: Sep. 2010 Proceedings: Proceedings of the VLDB Endowment, vol. 3, No. 2, pp. 1435-1446 http://citeseerx.ist.psu.edu/viewdoc/download?doi=10.1.1.174.6258&rep=rep1&type=pdf.

Manos Athanassoulis et al., Flash in a DBMS:Where and How?—Published Date: 2010, Proceedings: IEEE Data Eng. Bull. 33, http://www.cs.cmu.edu/~chensm/papers/flash-DEBull10.pdf.

Jaeyoung Do et al., Turbocharging DBMS Buffer Pool Using SSDs—Published Date: Jun. 12-16, 2011 Proceedings: SIGMOD'11, Proceedings of the 2011 international conference on Management of data, pp. 1113-1124http://pages.cs.wisc.edu/~jignesh/publ/turboSSD.pdf.

R. F. Freitas, W. W. Wilcke, Storage-class memory: The next storage system technology—Published Date: Jul. 2008 Proceedings: IBM Journal of Research and Development, vol. 52, Issue: 4.5, pp. 439-447 http://ieeexplore.ieee.org/stamp/stamp.jsp?tp=&arnumber=5388608.

Yongkun Wang, Research on High Performance Database Management Systems with Solid State Disks—Published Date: Dec. 2010, http://repository.dl.itc.u-tokyo.ac.jp/dspace/bitstream/2261/43997/1/48077412.pdf.

Otto, Adrian, "Memcached: More Cache = Less Cash!", Retrieved at <<http://www.rackspacecloud.com/blog/2009/07/29/memcached-more-cache-less-cash/>>, Jul. 29, 2009, p. 8.

Meier, et al., "Improving SQL Server Performance", Retrieved at <<http://msdn.microsoft.com/en-us/library/ms998577.aspx>>, May 2004, p. 32.

U.S. Appl. No. 12/717,139, filed Mar. 4, 2010, Celis.

Pullen, Tom, "Analyzing SQL Server 2000 Data Caching", Retrieved at <<http://www.sql-server-performance.com/articles/per/sql2000_data_caching_p1.aspx>>, May 3, 2005, p. 4.

Narayanan, et al., "Migrating Server Storage to SSDs: Analysis of Tradeoffs", Retrieved at <<http://research.microsoft.com/en-us/um/people/antr/MS/ssd.pdf>>, Proceedings of the 4th ACM European conference on Computer systems, Apr. 1-3, 2009, p. 14.

Kang, et al., "Cache Strategies for Semantic", Retrieved at <<http://ieeexplore.ieee.org/stamp/stamp.jsp?tp=&arnumber=4027167&isnumber=4027154>>, Proceedings of the Seventh International Conference on Web-Age Information Management Workshops, Jun. 17-19, 2006, p. 8.

Hutsell, Woody, "Faster SQL Server Database Access with the RamSan-210TM", Retrieved at <<http://www.texmemsys.com/files/f000128.pdf>>, Nov. 1, 2001, p. 9.

Cornwell, et al., "Accelerating Database Performance With Flash Storage Technology", p. 27, Oct. 12, 2009.

Exadata Smart Flash Cache and the Sun Oracle Database Machine, Oct. 2009, pp. 1-10.

Swart, et al., "This is your Database on Flash:Insights from Oracle Development", Retrieved at <<http://www.oracle.com/technology/deploy/performance/pdf/OracleFlash15.pdf>>, p. 35, Available at least as early as Mar. 4, 2010.

Lee, et al., "A Case for Flash Memory SSD in Enterprise DatabaseApplications", Proceedings of the 2008 ACM SIGMOD international conference on Management of data, Jun. 9-12, 2008, pp. 1075-1086.

International Search Report, Mailed Date: Nov. 17, 2011, Application No. PCT/US2011/026930, Filed Date: Mar. 2, 2011, p. 8.

Office Action dated Jul. 1, 2013 cited in U.S. Appl. No. 12/717,139.

Notice of Allowance dated Dec. 6, 2013 cited in U.S. Appl. No. 12/717,139.

Office Action dated Oct. 2, 2014 cited in U.S. Appl. No. 14/208,268.

Search Report Issued in European Patent Application No. 11751324.2, Mailed Date: Dec. 12, 2014, 9 Pages.

Notice of Allowance dated Mar. 24, 2015 cited in U.S. Appl. No. 14/208,268.

\* cited by examiner

MULTI-LEVEL BUFFER POOL EXTENSIONS

CROSS-REFERENCE TO RELATED APPLICATIONS

This application claims the benefit under 35 U.S.C. 119 to U.S. provisional patent application Ser. No. 61/497,420 filed Jun. 15, 2011, which provisional patent application is incorporated herein by reference in its entirety. This application is a continuation-in-part of U.S. patent application Ser. No. 12/717,139 filed Mar. 4, 2010, which is also incorporated herein by reference in its entirety.

BACKGROUND

Applications often use volatile memory to operate efficiently. During operation, data is read from mechanical disk into memory and potentially also written back to mechanical disk in discretely sized components called "pages". A buffer pool is memory used to cache blocks of memory (such as pages) as the blocks are being read from mechanical disk, or being modified in memory. The buffer pool improves performance by allowing data to be accessed from memory instead of from mechanical disk. As an example only, databases often use buffer pools in order to manage and index pages in memory.

As a system operates, the system will randomly access a working set of pages. Over time, as the system operates, that working page set will change, which often also leads to a change in size of the working page set. If the working page set is larger than the available buffer pool in the random access memory (RAM), then the system performs more random access operations from mechanical disk.

A mechanical disk is structured with a mechanical rotational magnetic media in which a disk head sweeps a magnetic platter to read and access data. Sequential read/writes are more efficient because they do not involve a mechanical sweep of the disk head, but merely involves the electronic transmission delay from the disk head and controller circuitry to memory. Thus, mechanical disk operations are much more efficiently used for sequential operations, while random access operations to mechanical disk can significantly reduce system performance. Thus, as the working page set becomes larger than the buffer pool, system performance degrades.

BRIEF SUMMARY

At least one embodiment described herein relates to an environment that includes a buffer manager that manages blocks of memory amongst multiple levels of buffer pools. For instance, there may be a first level buffer pool for blocks in first level memory, and a second level buffer pool for blocks in second level memory. The first level buffer pool evicts blocks to the second level buffer pool if the blocks are not used above a first threshold level. The second level buffer pool evicts blocks to a yet lower level if they have not used above a second threshold level.

In one embodiment, the first level memory is dynamic random access memory, whereas the second level memory is storage class memory, which includes, but is not limited to, a solid state disk. By using such a storage class memory, the working block set of the buffer manager may be increased without resorting to block access from yet lower level memory (such as disk), which may involve lower efficiency random access operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a buffer manager that manages blocks of memory amongst multiple levels of buffer pools is described. For instance, there may be a first level buffer pool for blocks in first level memory, and a second level buffer pool for blocks in second level memory. The first level buffer pool evicts blocks to the second level buffer pool if the blocks are not used above a first threshold level. The second level buffer pool evicts blocks to a yet lower level if they have not used above a second threshold level. In the case of more than two levels in the buffer pool, this lower level may be yet another level in the buffer pool.

In one specific example of a two level buffer pool, the first level memory may be dynamic random access memory, whereas the second level memory may be storage class memory, such as a solid state disk. By using such a storage class memory, the working block set of the buffer manager may be increased without resorting to lower efficiency random block access from yet lower level memory such as disk. First, some introductory discussion regarding computing systems will be described with respect to FIG. 1. Then, the embodiments of the buffer pool extensions and their operation will be described with respect to FIGS. 2 through 10.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
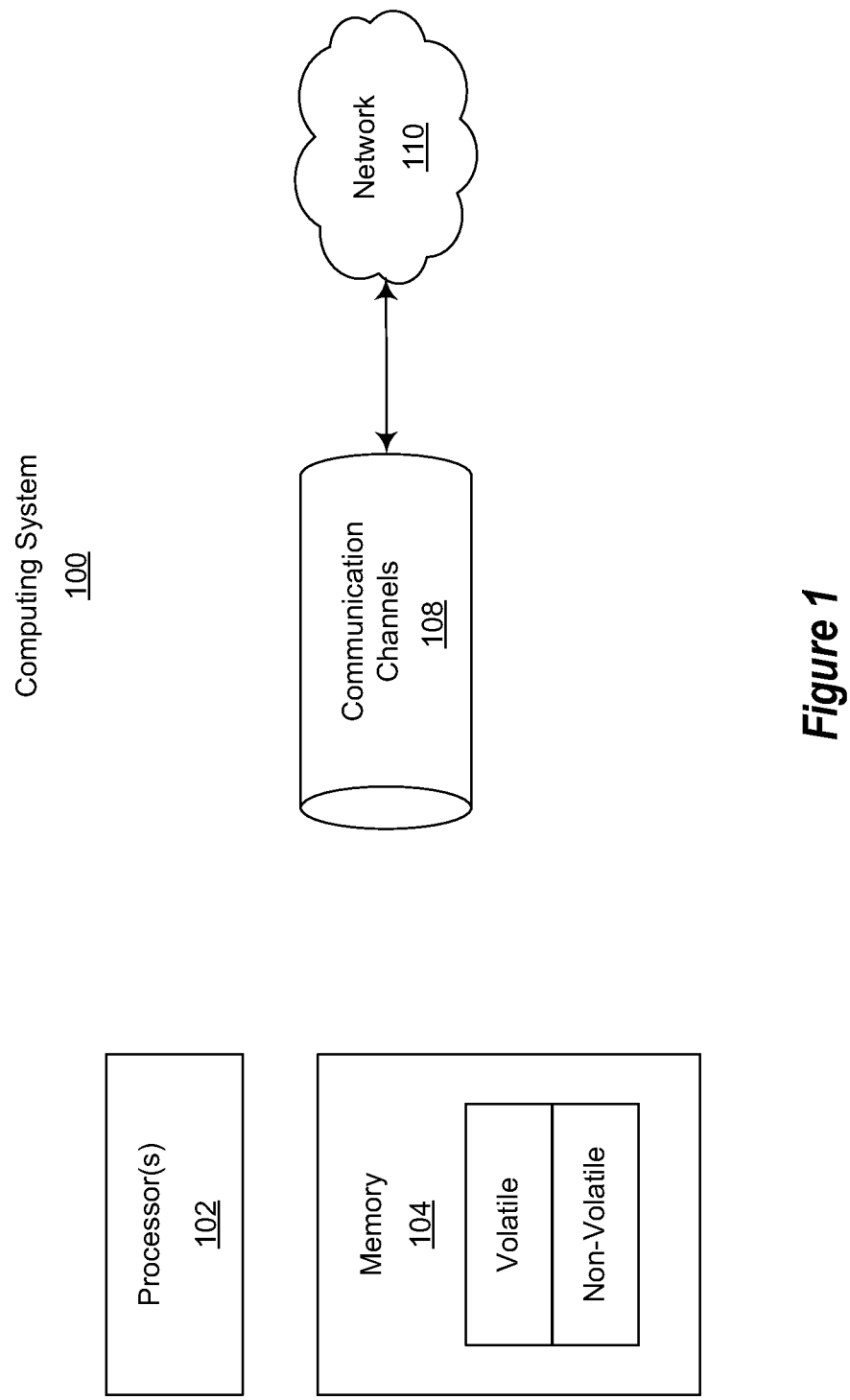
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. For instance, such media may include Solid State Disks (SSDs) or Storage Class Memory (SCM), discussed further below in detail. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In accordance with embodiments described herein, the buffer pool size is augmented by using multiple memory levels of memory hierarchy. The lower the level of memory hierarchy, the faster the average access speeds. For instance, first level memory will have a faster average access speed than the second level memory. In accordance with one embodiment described herein with respect to FIG. 2, the buffer pool is extended to use a second level memory. However, the principles described herein may be extended to buffer pools having more than two memory levels also. In the embodiment described with respect to FIG. 2, the first level memory may be, for example, dynamic random access memory, and the second level memory may be, for example, Storage Class Memory (SCM), although the principles described herein are not limited to such examples. The second level memory may be persistent memory, although it may also be volatile memory, without departing from the principles described herein.

The term "SCM" is known in the art, and this description incorporates the known definition of the term. An SCM has the following properties.
1. The memory is solid state;
2. The memory is randomly accessible;
3. The memory has lower latency than mechanical disk;
4. The memory has random I/O throughput greater than mechanical disk.
An SCM may also optionally have the characteristic that it is non-volatile, although not required.

A Solid State Disk (SSD) is distinct from a mechanical disk as SSDs are solid state devices. The SSD additionally has the following properties which may also be included in some, but perhaps not all, of other types of SCMs that may be used with the principles described herein:
1. High granularity random access.
2. Larger capacities than DRAM (capacity is in the order of that magnetic disk).
3. Higher transistor densities than DRAM (more store per unit of area and volume).
4. Lower power consumption and dissipation than spinning media and DRAM.
5. Typically no Direct Memory Access between the SSD and disk. Instead, the data has to flow through DRAM to get to disk.

Other types of SCMs include Phase Change Memory (PCM), Ferrous Oxide, and Memristor, which potentially have lower latencies and better access granularities than SSD. However, the principles described herein are not even limited to currently existing SCM technology, and may be extended to apply to SCM technology developed in the future or to any second level memory other than SCM also. Regardless, some embodiments described herein take advantage of these SCMs properties. Although SSDs are occasionally discussed herein as an example of SCMs, such examples should not be construed, by any means whatsoever, as limiting the principles of the present invention to a single type of SCM. As the term is used herein, an SCM may encompass one or more Storage Class Memory devices. The SCM may be located locally, or perhaps even remotely in which case the storage is accessed over a network link. Stated more generally, any storage with any connection can be used at level N (where N is an integer) if its random access latency and/or bandwidth are better than that at level N+1.

In accordance with the principles described herein, a buffer pool manager allocates blocks of memory (hereinafter simply called "blocks") to at least two levels of memory depending on the pattern with which the block is accessed. As previously mentioned, an example of a block is a "page", although the principles described herein are not limited to that. A "page" is a block unit of memory stored in the buffer pool cache, and represents the unit of memory that is transferred in and out of the cache. For instance, more frequently accessed blocks may be allocated to the first level memory, whereas blocks that are accessed with lesser frequency are allocated to the second level memory, and blocks that have even lower frequency of access are perhaps not allocated within the buffer pool at all.

As used herein, "hot blocks", "warm blocks" and "cold blocks" are terms used to describe blocks in terms of how frequently the blocks are accessed by the system, with higher temperature references implying more frequent access. Thus, hot blocks are accessed by the system more frequently than warm blocks, and warm blocks are accessed by the system more frequently than cold blocks. As operational needs change, the frequency of access for a given block may also change. Thus, a hot block may later become warm or cold, a warm block may later become hot or cold and a cold block may later become warm or hot. The principles described herein are not limited to the manner in which blocks are determined to be hot, warm, or cold, nor to the threshold between hot and warm, or between warm and cold. In some embodiments, the next-to-last access time may be used to determine the temperature, rather than the frequency. However, the principles described herein are not limited to the conversion process or mechanism from an access pattern to temperature.

A "working block set" of the system is a set of blocks that are more frequently accessed in order to perform current operations of the system. In one example, the memory levels in the buffer pool are efficient at performing random access operations, whereas a memory or storage (such as a disk) outside the buffer pool (also referred to hereinafter as "external storage") is not as efficient at performing random access operations.

In accordance with at least some embodiments described herein, if the size of the buffer pool grows (by extending the buffer pool to use second level memory) to encompass most of the working block set of the system, hot blocks are written less frequently to the external storage by diverting these writes to the second level memory. As an example, such a second level memory may be non-volatile SCM. In the prior technology, such hot blocks may have been written to external storage perhaps due to memory pressure since the working block set becomes significantly larger than the maximum buffer pool size. The principles described herein take advantage of the faster random I/O performance of a second level memory (such as SCM) as compared to external storage (such as disk) to dramatically improve I/O latency and throughput.

Figure 2:
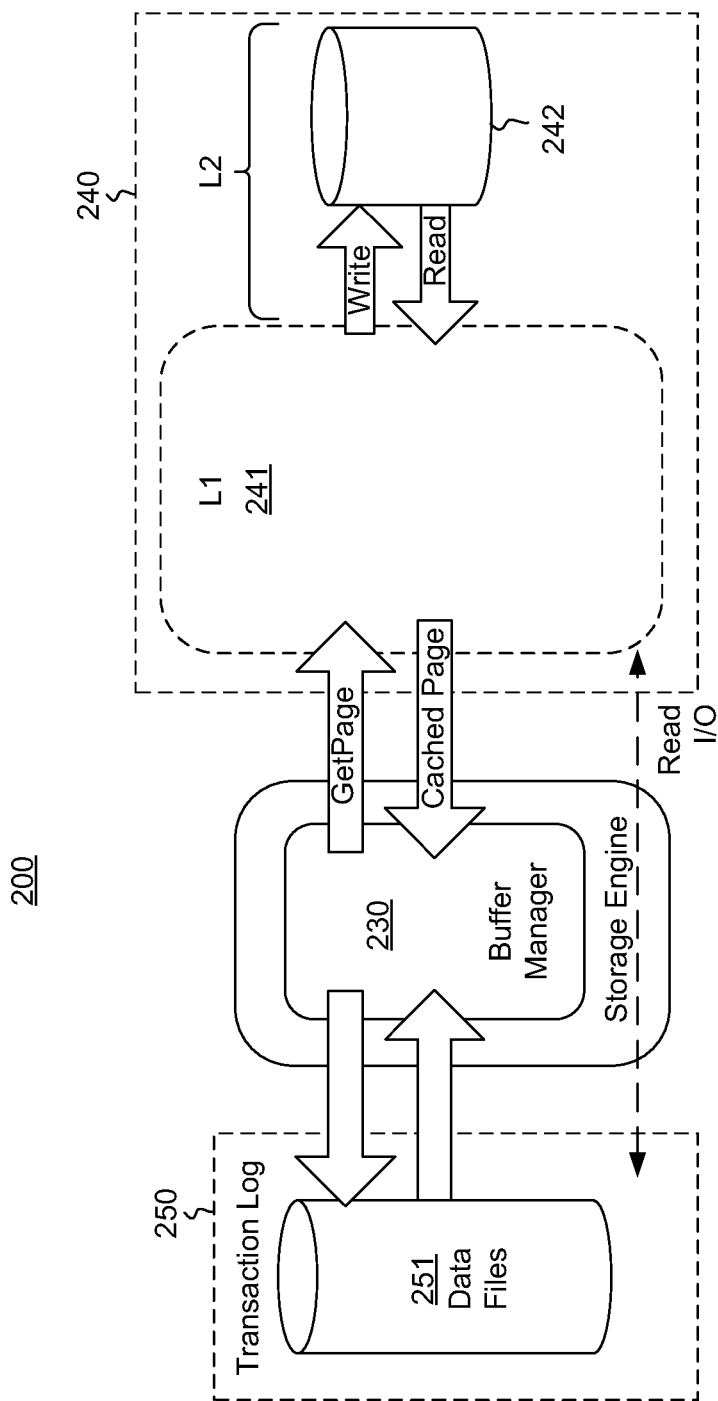
FIG. 2 abstractly illustrates of an example environment in which a buffer manager manages allocation of blocks in a buffer pool, populates the buffer pool with blocks from external storage when caching is appropriate, and writes block updates from buffer pool back to external storage when appropriate.

FIG. 2 loosely illustrates an example environment 200 in which a buffer manager 230 manages allocation of blocks in a buffer pool 240, populates the buffer pool 240 with blocks from external storage 250 when caching is appropriate, and writes block updates from buffer pool 240 back to external storage 250 when appropriate. The buffer pool 240 also acts as a clearinghouse for all I/O requests received from applications and finds where the block is located (e.g., within the buffer pool 240 or the external storage 250) to fulfill the I/O request. The buffer pool 240 includes first level memory 241 (also referred to as a "first level buffer pool") and a second level memory 242 (also referred to as a "second level buffer pool").

The application need not know the details of the buffer pool management operation. Rather, I/O requests are issued by the buffer pool manager 230 as those requests are provided to the buffer pool manager. The principles described herein are not limited to the application that makes such requests, but applications that require a larger working block set may be particularly benefited by the principles described herein. For instance, database applications such as relational database applications often have large working block sets.

The buffer manager 230 is an I/O broker, and is a component that issues I/O requests to the disk and other storage media to fetch blocks from and store blocks to the external storage and buffer pool. For instance, there may be additional layers that expose read/write APIs for an application (such as a database) given the file and block identifiers. For read requests, the buffer pool manager 230 checks if the page is already in the buffer pool 240. If the block is not in the buffer pool 240, the buffer pool manager 230 pulls the block from external storage 250, puts the block in the cache, and responds to the read request. The data files 251 represent data on external storage 250 that may be read from and written to (i.e., paged into and out of in the case of pages) the external storage 250.

For write I/O requests, if the block is not cached in the buffer pool 240, the buffer pool manager 230 writes the block to the external storage 250, or queues the write to the external storage 250 until multiple writes can be accumulated for a sequential write operation. If the block is located in the buffer pool 240, then the buffer pool manager 230 updates the block in the buffer pool 240, and then either writes the update to the external storage 250, or queues the update to be written with other blocks in a sequential write operation.

In one embodiment, the first level buffer pool 241 is a resource shared by multiple applications for their cached blocks. In some embodiments, there is one first level buffer pool 141 instance per application instance. For example, in the case of SQL Server, there may be one buffer pool 141 instance per SQL Server instance. Alternatively, there may perhaps even be one buffer pool 141 instance per database. However, in the description that follows, the buffer pool instances are described as being on a per service instance basis, though the broader principles are not limited to such an embodiment.

In some cases, the processors of the computing system may have multiple Non-Uniform Memory Access (NUMA) nodes. In that case, the first level buffer pool 241 may be partitioned on each NUMA node. The buffer pool manager 230 has a lazy-writer (not shown) associated with each NUMA node. Lazy writer threads maintain a small number of available buffers for its buffer pool consumers to prevent the consumers from constantly stalling while waiting for the buffer. Because the first level buffer pool 241 is a monolithic per-instance component in this embodiment, the first level buffer pool 241 can afford to partition its significantly sized data structures per-CPU or per-NUMA node. This eliminates the need for explicit synchronization on buffer pool data structures. CPU's, their caches, and memory may be partitioned into solid state nodes. Proximity of memory to a memory node determines the latency of access. The closer the node, the faster the access; the farther the node, the slower the access.

In some embodiments, the buffer pool manager 230 no longer performs its own memory management. Instead, the buffer pool manager 230 relies on a memory manager (not shown) that allocates and frees buffer descriptors (BUF structures—described below) and memory blocks. The memory manager is NUMA-aware and allows the buffer pool manager 133 to abstract NUMA node affinity and memory management orthogonally.

The maximum and minimum size of the buffer pool 240 may be determined at configuration time. This occurs perhaps during startup or during some configuration of the application. This determines the maximum number of blocks that can be cached in the buffer pool at any time in the running instance.

As a working block set grows, shrinks, or moves, blocks may have to be evicted to make room for newer database pages in the buffer pool cache. Every buffer descriptor contains information about the last two times a block was referenced and some status information, including whether or not a block has been dirtied by an update.

Figure 3:
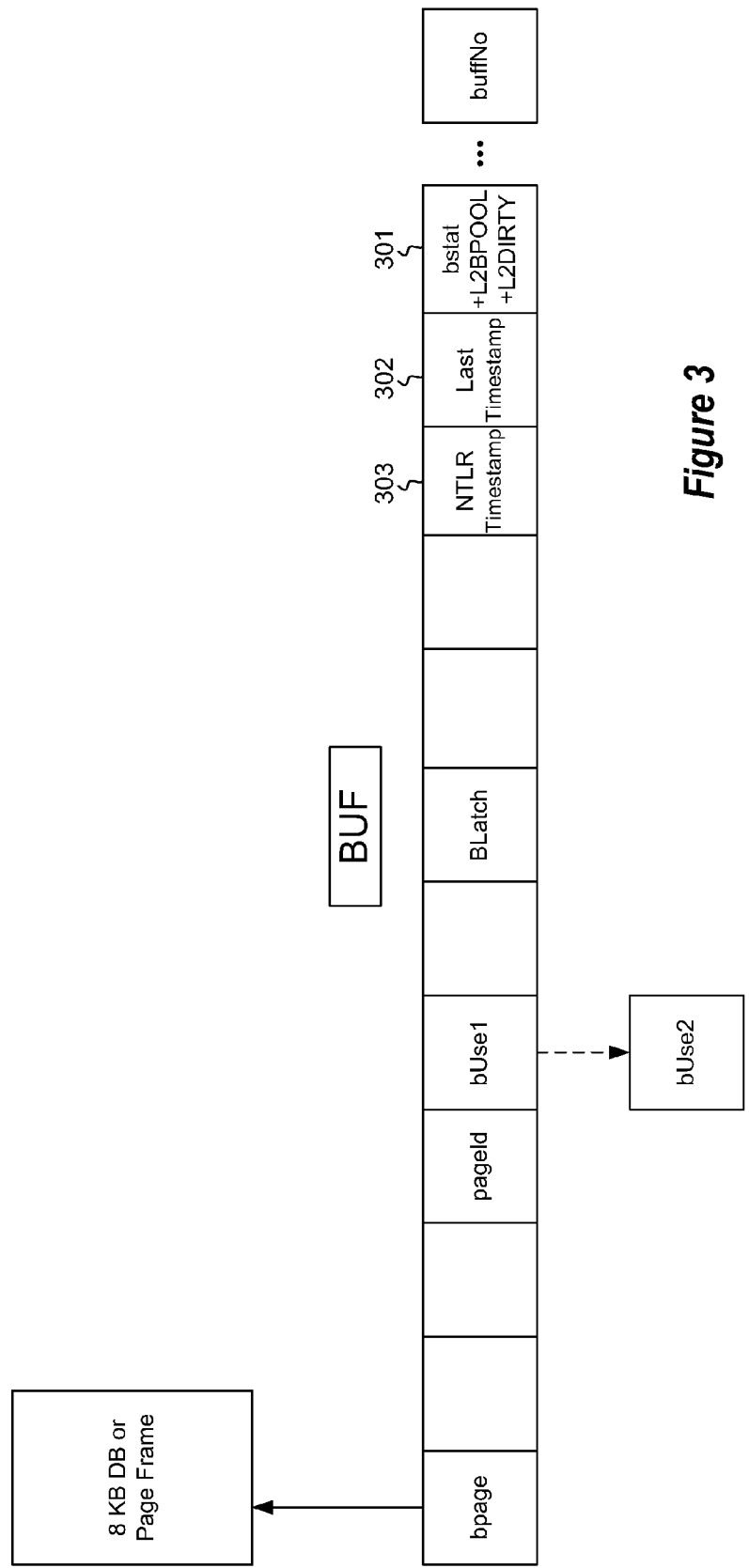
FIG. 3 illustrates a BUF descriptor structure that represents an example of such a buffer descriptor in the case in which the block is a page, in which the block data is stored within a page frame.

FIG. 3 illustrates a BUF descriptor structure that represents an example of such a buffer descriptor in the case in which the block is a page, in which the block data is stored within a page frame. The BUF descriptor is similar to a SQL Server BUF descriptor except that two bits 301 (BUF_L2BPOOL and BUF_L2DIRTY) are added to the bstat field of the BUF descriptor, and in which there are two timestamps Last Timestamp 302 and the Next to Last Reference (NTLR) Timestamp 303. The meaning of each bit and timestamp will now be described.

The BUF_L2BPOOL bit indicates that the copy of the page frame has been written to an L2 page file, which is the contiguous extent of storage in the second level buffer pool (SCM in this example). The L2 page file is statically sized and created when the use of the second level buffer pool 242 is enabled. Changes to the L2 page file configuration are allowed when the second level buffer pool 242 is disabled. For solid state disks, since the storage stack is traversed, this is represented as a file system file, or potentially a raw disk volume. In other embodiments of this invention this may be a contiguous memory segment bypassing the storage stack. This memory segment may be backed by local storage or remote storage across a communications link.

The BUF_L2DIRTY bit indicates that the copy of the page frame on the L2 page file is stale relative to the copy of the page frame in the first level buffer pool 241 (e.g., DRAM). An update has occurred to the page in the first level buffer pool 241 after the last time the page was written to the second level buffer pool 242.

The Last Timestamp 302 represents the last time the corresponding page was accessed. The Next to Last Reference 303 Timestamp represents the next previous time that the corresponding page was accessed. In one embodiment, the temperature of the corresponding page may be ascertained by comparing the NTLR timestamp with the current time with a lesser time difference implying a higher temperature page.

In the described implementation, setting the BUF_L2BPOOL bit is a condition for BUF_L2DIRTY being set. A page frame in the L2 page file cannot be dirty with respect to the page in the first level buffer pool 241 unless it has first been written into the L2 page file. None of the changes described above affect either the size or alignment of the BUF structure.

In one example, the reference information is used to implement the page replacement policy for the cache data pages using an LRU-2 algorithm. However, that is not required as the principles described herein may be used for any block or page replacement algorithm. However, in specific examples described herein, LRU-2 will be mentioned more commonly.

All pages in the buffer pool 240 are periodically scanned from start to end. During the scan, the value is assigned to each buffer based on its usage history. When this value is below the low threshold, the pages are considered cold and evicted from the cache. Clean (non-dirty) pages are evicted by un-hashing the descriptor from a buffer pool hash table and freeing the memory for the buffer descriptor and its page frame with the memory manager. Otherwise a write is scheduled to write the page to external storage strictly conforming to write-ahead logging (WAL) rules for dirty evicted pages. After the write is completed, the page is no longer dirty, it is un-hashed, and both its buffer descriptor and page frame are freed.

In some embodiments, individual worker threads primarily perform the work of scanning the buffer pool, writing dirty pages, and populating the buffer free list after they have scheduled an asynchronous read and before the read is completed. Once the read is initiated, the worker thread determines if the memory manager has no pages available to satisfy requests for new pages entering the cache. If there are no pages available, the worker thread calls a routine to replenish the buffer pool cache with free pages. The worker thread then scans a further set of BUF descriptor structures and checks their next-to-last-reference (NTLR) timestamps to determine which buffers can be freed up. The next BUF descriptor entries may be determined by, for example, a buffer clock hand. If a write has to be performed for a dirty buffer in that scan window, the write is scheduled. After the scan the buffer clock hand is advanced to the next set of BUF descriptor structures.

Each instance of server (e.g., each SQL Server instance) also has specialized threads called "lazy writers". There is a lazy writer associated with each NUMA node. The function of the lazy writer threads is to lazily write-behind dirty blocks to external storage 250 regardless of whether those blocks are hot, warm, or cold. In some embodiments, the lazy write only writes out cold pages and once the lazy-write is completed the page gets evicted.

The buffer pool manager 230 maintains a small number of available buffers for its buffer pool consumers to prevent them from constantly stalling waiting for the buffer. A lazy writer thread scans that part of the buffer pool associated with its node. The lazy writer sleeps for a specific interval of time, or until under node memory pressure it is woken up by another worker thread on the node. When the lazy writer wakes up, it checks if there are enough free buffers—that is, if the number of available buffers is above a certain threshold which is a function of the buffer pool size. If there are not enough free buffers, like the worker threads, the lazy writer scans the buffer pool to repopulate the free list for that node. Buffers added to the free list are also written back to database pages on disk, following the WAL rules, if they are dirty.

Application-Based Virtual Blocks

This section introduces the notion of application-based virtual blocks. Specifically, in one example, the application-based virtual block is described in the context of a SQL Server instance, but the principles described herein may be more broadly applied in to any relational database server, or any application for that matter.

In this case, the buffer pool is divided into two, the first level buffer pool (referred to herein as "L1") that corresponds to the DRAM as an example, and a second level buffer pool (referred to herein as "L2") that corresponds to the backing store 242. As the primary L1 buffer pool exhausts its available DRAM, the buffer pool writes pages out to the L2 buffer pool freeing up page frames for reuse. When a buffer without a page frame is referenced, the buffer pool manager allocates the page frame and faults the page from its L2 cache to its L1 cache. FIG. 2 illustrates the position of the L2 buffer pool 242 backed by a storage class memory relative to the L1 buffer pool 241 in DRAM. Note that there is an interface abstracting paging I/O between the L1 buffer pool 241 and the L2 buffer pool 242.

Figure 4:
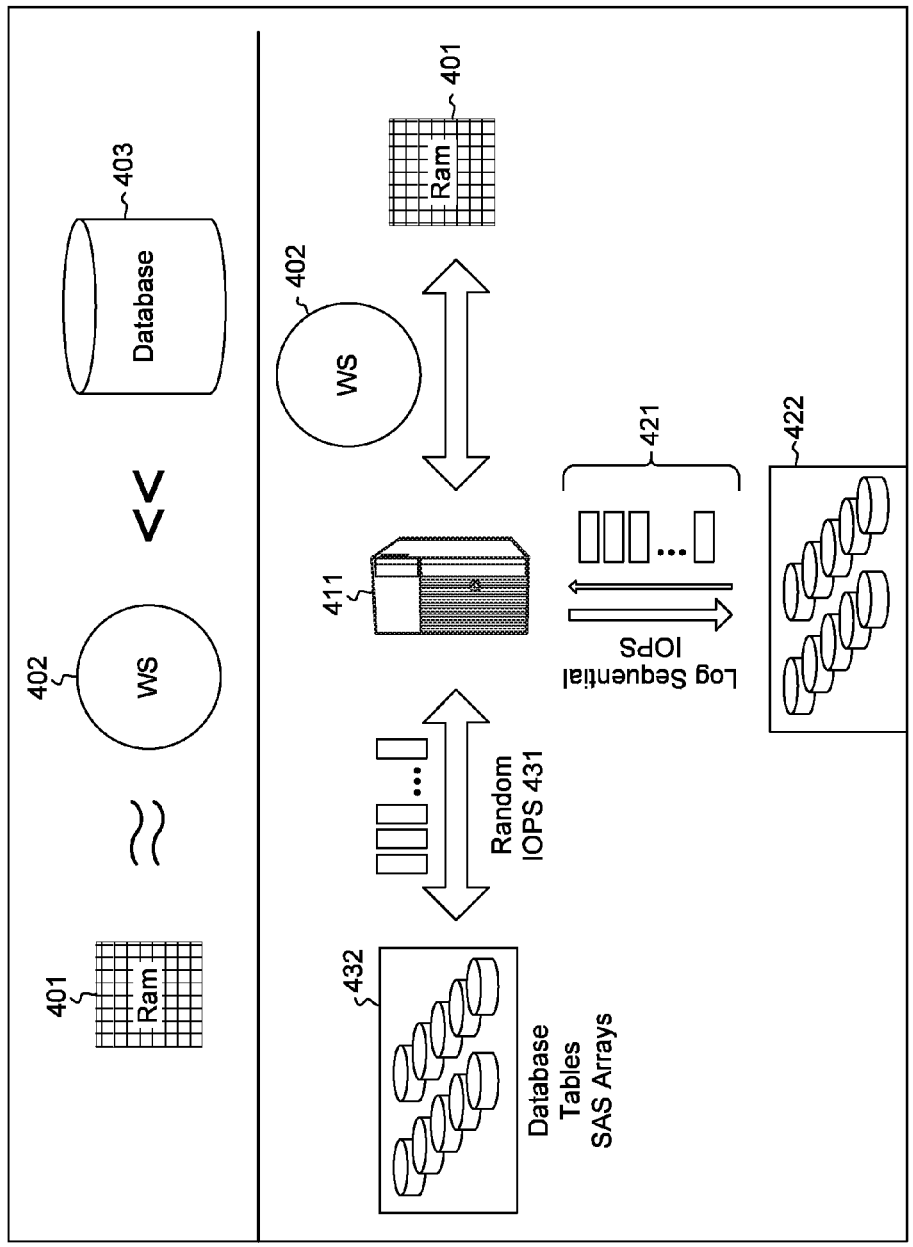
FIG. 4 illustrates a working environment in which a server is in communication with memory to operate a working set that is larger than the memory.

As FIG. 4 shows, economics forces the DRAM 401 configured for a database workload to be typically much smaller than the working set 402 of that workload. Also because most database applications operate on small portions of the database at a time, the working set 402 is typically smaller than the database 403, which is one example of a client application. When a workload progresses from initialization to steady-state, its working set grows gradually at a rate depending on the computation time and the available bandwidth populating memory from disk. During the ramp-up phase database pages are mostly read, either randomly or sequentially, from spinning media. There reaches a point where the working set does not fit in memory and the database cache is forced to evict pages from memory as explained below.

Random access to pages in memory leads to evictions of pages to random block addresses on disk. Although conventional solutions coalesce pages into large blocks during eviction from memory to disk, most writes by the worker threads and the lazy writer are small random I/Os typically between 8 KB and 32 KB. Similarly for a random workload, whenever there is a buffer pool cache miss, the buffer pool manager faults database pages by reading randomly from spinning media. This implies that as a working set grows, shrinks, or moves (remains the same size but changes) the performance of any random workload is capped by the random I/O throughput of the underlying disk subsystem. Today, the average random IOPS rating for a commercial grade 7200 rpm SATA drive is 80 while that of a 15 Krpm FC or SAS drive is 110-120 Krpm. Driving up the IOPS on spinning media to meet peak workloads usually involves over-provisioning the I/O subsystem with 10's to 100's of spindles, increasing up-front capital expenditure and significantly reducing the Mean Time To Failure (MTTF) of any disk in the I/O subsystem.

FIG. 4 also shows the server 411 in communication with DRAM 401 to thereby operate on the working set 402. Note the presence of sequential IOPS 421 to disk 422 as well as the highly inefficient random IOPS 431 to disk 432.

One way of eliminating the performance barrier of small random I/O's to disk (or other storage that is less efficient at small random access I/Os) is increasing the system DRAM. However, the configured DRAM on a server is limited by economics and bus bandwidth in the memory subsystem. SSDs are an example of an SCM that is a source of cheap and efficient random IOPS. Although today the price/capacity of SSD block storage is not as competitive as disk, their price/random IOPS is superior, especially for small random reads. Where possible, the design offloads random IOPS from mechanical disk to SSD. SSDs behave analogously to EEPROMs but furnish orders of magnitude more and provide cheaper capacity with low latency and non-volatile random access mass storage. However, the principles described herein may use any type of SCM that creates a memory hierarchy between DRAM and a higher latency non-volatile storage source. For example, disks may be replaced by SSD's when the economics of doing so is right. Faster SSD's or some other type of SCM such as PCM or memristors may become the intermediate backing store for caching pages. In general the invention applies to and takes advantage of any memory hierarchy, as described in the summary to improve performance.

Figure 5:
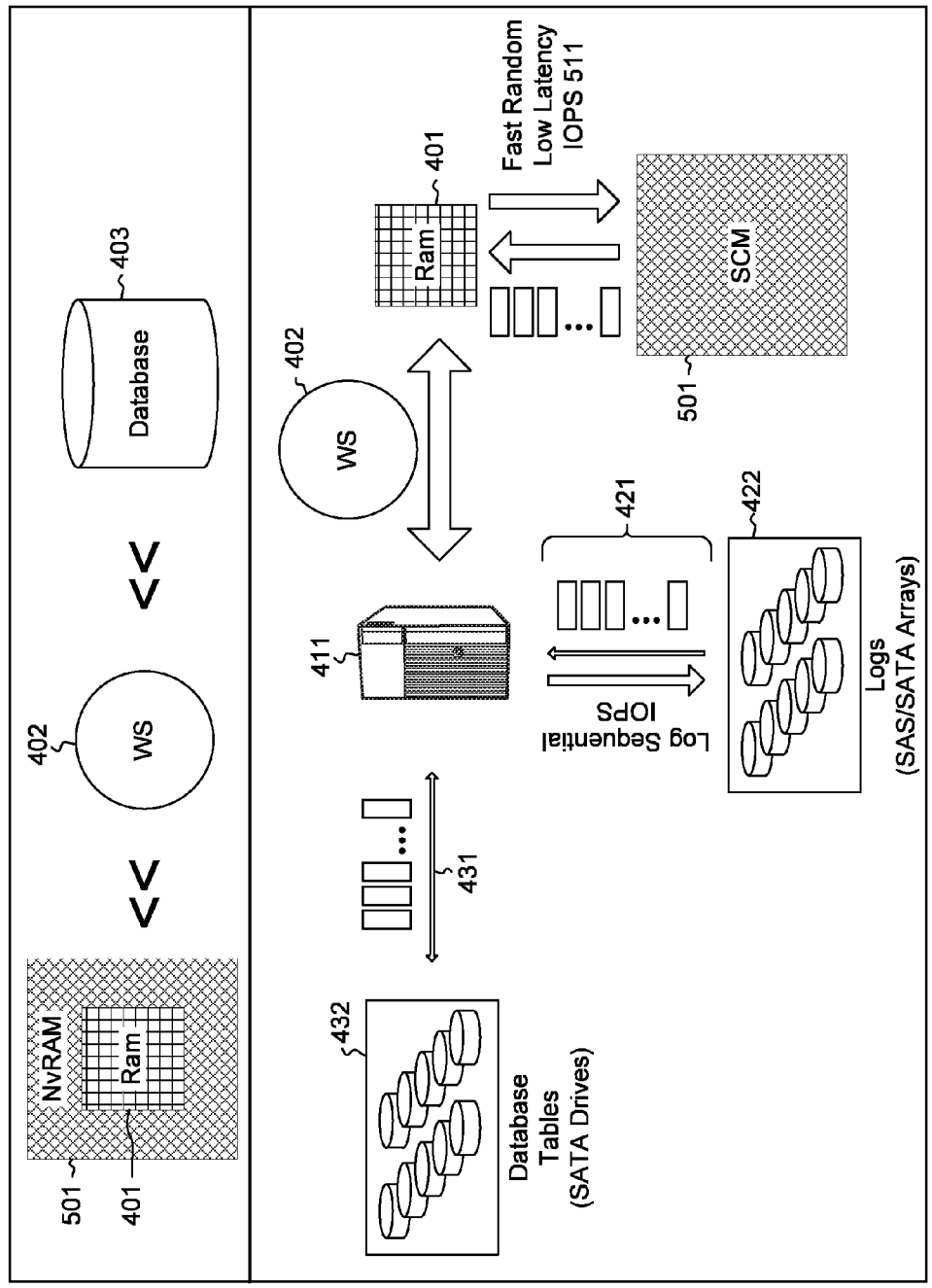
FIG. 5 illustrates a working environment in which a server is in communication with memory that is augmented by storage class memory to operate a working set that is smaller than the augmented memory.

FIG. 5 shows that by increasing the capacity of the buffer pool cache with large capacity Non-volatile Memory (NvRAM) 501, most of the active working set becomes resident in the cache. For instance, working set 402 may now more easily fit within the confines of the combination of RAM 201 and NvRAM 501. This has the effect of offloading random IOPS so that they occur not with the disk, but instead, occur between the RAM 401 and the NvRAM (or SCM) 501 (reference fast random low latency IOPS 511). Note further that the number of random IOPS 431 that occur with the disk 432 has decreased dramatically. Recall that the disk 432 may be replaced by other storage devices in the future (such as an SSD) and thus the principles described herein are not limited to the type of storage device(s) that the intermediary backing store intermediates with the DRAM.

Buffer pool faults from and to mechanical disk (or other storage device that replaces the disk as a storage device) are reduced to a trickle because most of the demand paging and eviction shifts to the 2-levels of memory, DRAM and SCM, that now constitute the buffer pools L1 and L2. With the larger combined buffer pool size, pages move between the buffer pool and mechanical disk more because the working set itself moves, grows, or shrinks. These I/O workloads are less eruptive and voluminous, smoothing and alleviating the IOPS demand on mechanical disk during normal processing, when the working set is much larger than the available DRAM. The SCM does most of the random I/O heavy lifting to move pages in and out of DRAM. This leads to much improved system performance as SCM has much faster random IOPS speeds, and since the cost of such operations is reduced.

A SATA, SAS, or PCI/e connection to the host replaces or augments the mechanical disk drive. Using an SCM as a tier in the disk storage hierarchy is not mutually exclusive to buffer pool extensions, but complementary.

A specific example implementation will now be described in some detail. That said, this is just a very specific example. The principles described herein are to be applied to any extension of the DRAM buffer pool using SCMs to offload at least some random access operations that would otherwise be performed with higher latency storage device(s). The details of just one specific embodiment will now be described with the caution that this is just one of an infinite variety of implementations that may fall within the larger and broader scope of the more generalized principles described and claimed herein.

The buffer pool extension described in this document may extend off of existing data structures. For instance, in one embodiment that is about to be described in further detail, the main changes are to the BUF data structure, the size of the BUF array, the introduction of a page frame pool per NUMA node, and a L2 page file on the SCM. The following sections outline these changes.

Figure 6:
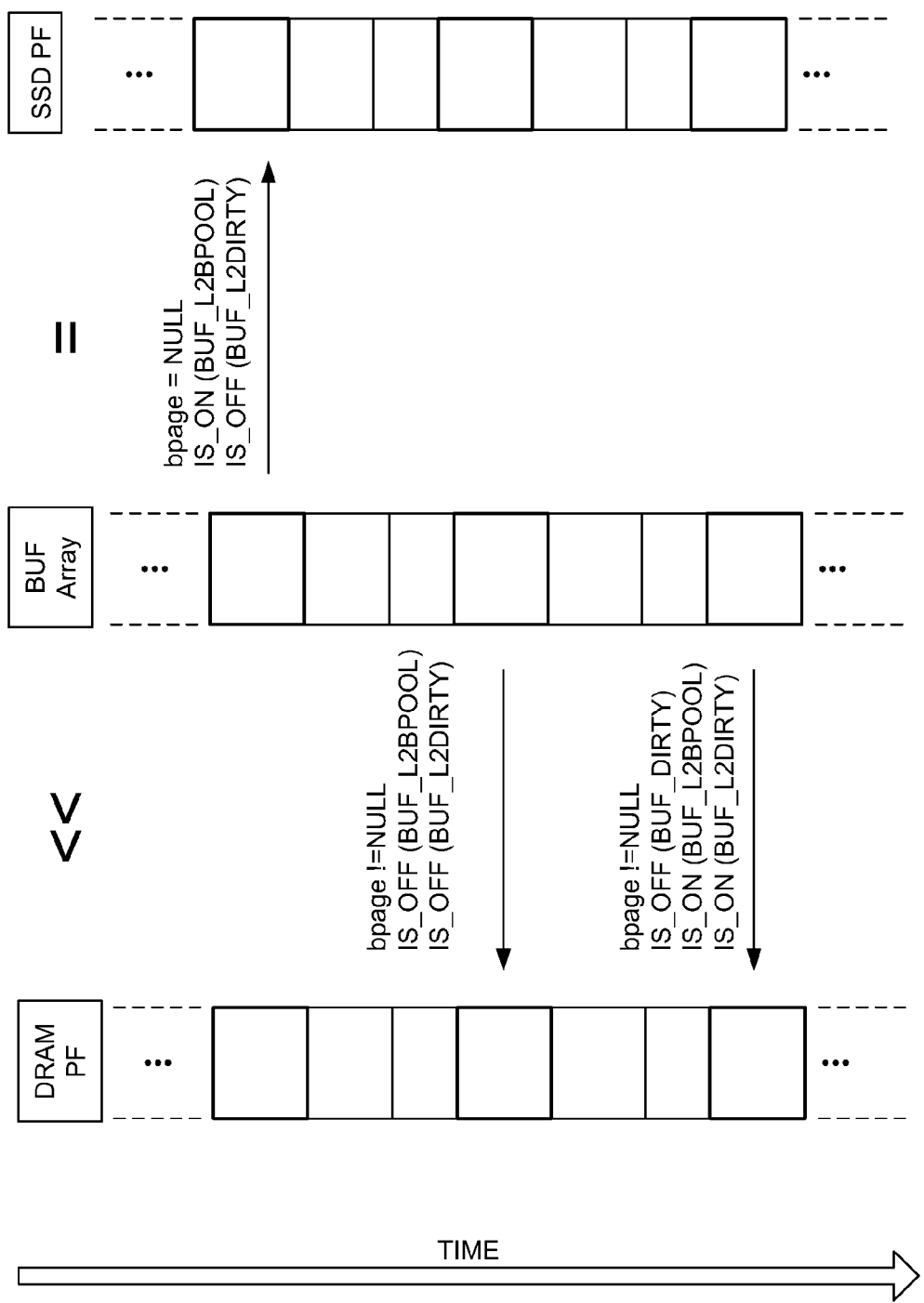
FIG. 6 illustrates the relationships among page frames, the BUF array, and the L2 page file in one specific embodiment.

In one embodiment, the buffer pool manager creates as many descriptors as there are pages in the page file, creating a one to one correspondence mapping such that every descriptor matches one page slot in the page file. This allows for a simple allocation scheme which reserves an L2 page slot for every BUF structure allocated from the BUF array. The offset of a page frame in the L2 page file is a simple calculation that translates the ordinal BUF descriptor number to an 8K-aligned offset in the L2 page file. FIG. 6 illustrates the relationships among page frames, the BUF array, and the L2 page file in the specific embodiment described. However, recall the previous statements about how the broader principles of the present invention are not limited to this specific embodiment.

Consider a situation where there is memory pressure as the working set of the database workload grows to exhaust the buffer pool cache. Colder pages may have to be evicted from L2 buffer pool. If these pages are clean pages, then their BUFs and page frames are simply freed for reuse. Dirty pages committed to the L2 page pool (BUF_L2POOL=1, BUF_L2DIRTY=0) have to be written to database pages on disk. In this specific embodiment, there are no Direct Memory Access (DMA) transfers from the L2 page file to disk, so the buffer manager first reads the page from the L2 page file then writes it out to disk. Before doing so, the buffer manager first allocates a page frame to map the page from the L2 buffer pool and use that page frame for DMA to disk. But the buffer pool manager is under memory pressure and allocating the page frame increases the demand for memory. The increased demand for memory forces more evictions which potentially increases the demand for page frames—a vicious cycle resulting eventually in an out-of-memory state.

In one implementation of the buffer pool extension described herein, this problem is solved by reserving small pools of page frames per NUMA node. The number of page frames reserved is a function of the maximum numbers of outstanding I/Os for the buffer pool manager and the maximum contiguous I/O size to disk (or other storage device that has lower latency than the SCM used as the backing store). When a dirty page needs to be evicted from the L2 buffer pool, it is allocated from the page frame pool on the NUMA node corresponding to that of BUF structure associated with the page.

The buffer manager exposes the augmented buffer pool 240 as a pool of block slots on a segmented portion of the second level buffer pool 242 exclusively owned by a client making I/O requests to the buffer pool manager 230. In particular, when the select level buffer pool 242 is NAND-flash SSD, the augmented memory corresponds to an exclusively owned page file on the SSD.

The latency differential places the SCM somewhere between DRAM and disk in the memory hierarchy with access times to SCM in the order of microseconds as opposed to 10's of nanoseconds and milliseconds to DRAM and the disk storage subsystem, respectively. Preferably, the SCM is separated from the CPU solely by the memory controller hub and is directly attached to the I/O controller hub via PCI/e or another standard interface. This has the following advantages:
  1. No bridging is necessary when accessing the SCM
  2. SCM is closer to processors and network bridges.
  3. SCM has higher bandwidth per lane than that over SATA, SAS, and FC I/O protocols.
  4. SCM will always display better aggregate performance because of switching and trunking technologies as opposed to bridging.

Hence, the design favors a hardware configuration where the SCM lies closer to the CPU, where aggregate bandwidth is in GB/s as opposed being an integrated component on the disk storage stack with aggregate bandwidths in the order of 10 s or 100 s of MB/s.

Figure 7:
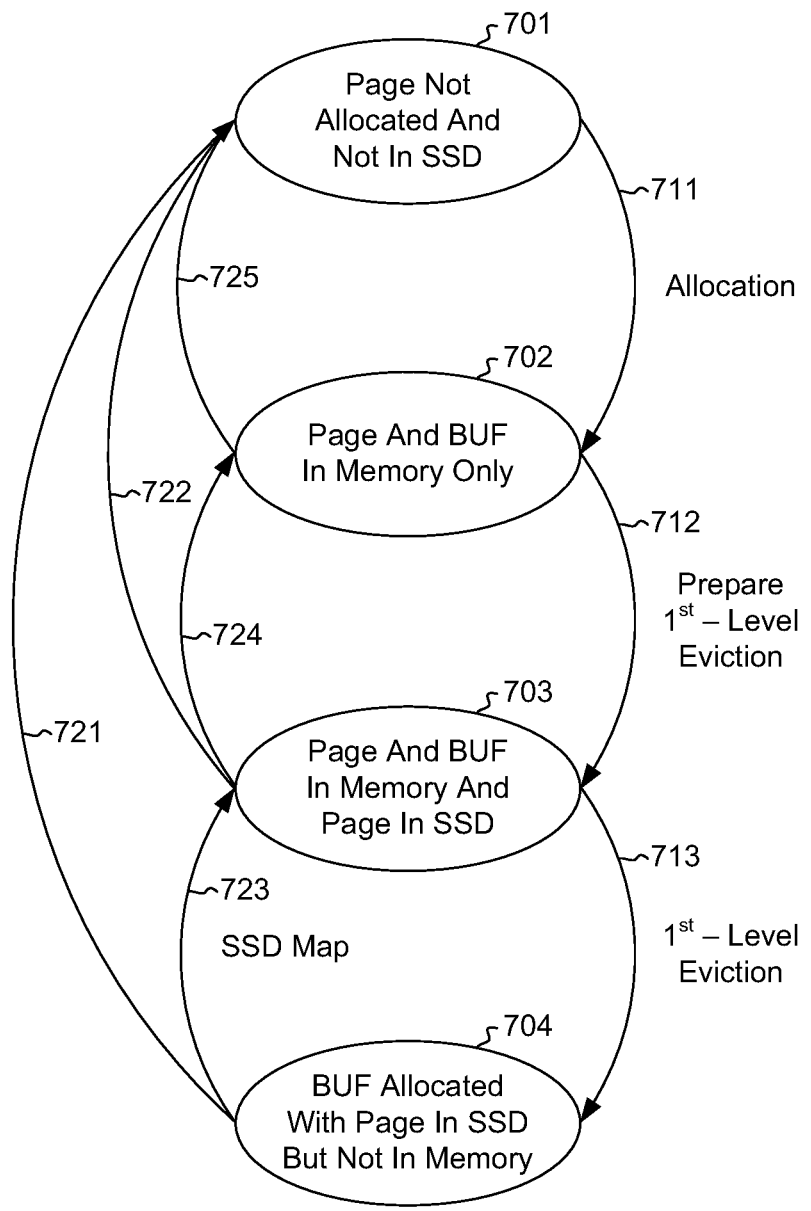
FIG. 7 illustrates a state diagram illustrating a two level eviction process associated with a two level buffer pool hierarchy.

Typically, the buffer pool manager 230 evicts blocks out of the buffer pool 240 eagerly under memory pressure, or lazily when the block is no longer part of the active working set. The two-level buffer pool hierarchy allows a two level eviction mechanism as illustrated in FIG. 7. Both levels of eviction may use the existing LRU-2 page replacement policy, although another replacement policy may suffice. However, as previously mentioned, the principles of FIG. 7 may be extended to buffer pool hierarchies with more than two levels also.

With first level eviction (i.e., L1 eviction), the buffer pool manager 230 moves the most recent version of any page, both clean and dirty, from the L1 buffer pool 241 to the L2 buffer pool 242. That is, the buffer pool manager un-maps or copies evicted pages in DRAM to the SCM page pool. In the SSD case, this translates to page writes to the SSD page file. After the mapping, the page in virtual memory may or may not be freed but the corresponding BUF structure remains hashed with a corresponding reference to the offset of the page on SSD. On demand, pages may be migrated back from the L2 to the L1 pool by mapping, or reading, them from the SCM page pool to virtual memory.

FIG. 7 shows if there is no recent demand for a block (e.g., a page), at first, the page is not in the buffer pool (see state 701). When there is demand for a page, the buffer manager allocates a BUF descriptor and hashes the page identifier onto the BUF hash table for quick lookup (reference transition arrow 711 transitioning to state 702). Although the page may be evicted directly from the L1 buffer pool back to external storage (e.g., disk) (reference transition arrow 725), L1 eviction divides into two phases. In the first phase, the buffer manager un-maps the current version of the page to the L2 page file but keeps both the BUF array element and page frame allocated (reference transition arrow 712 transitioning to state 703). During the first phase, if the page is re-referenced before commitment the page frame, the page is made available without the overhead of faulting the page back in from the L2 page file (reference transition arrow 724 from state 703 to state 702). In the second phase, the buffer pool manager relinquishes the page frame from the BUF structure but the BUF remains hashed with a copy of the most recent version of the page in the L2 pool (reference arrow 713 transitioning from state 703 to state 704).

In this description, the first phase (arrow 712) is referred to as the preparation phase and the second stage (arrow 713) is referred to as the commitment phase. Under enough memory pressure, the buffer manager may combine the first and second stages to relinquish virtual memory associated with the page immediately. In practice both the preparation phase and commitment phase are combined but the design separates them into two distinct phases. The separation shows that if there is not too much memory pressure, it is possible to save a read back from the L2 cache if the page is quickly re-referenced after the 1st-level eviction. On demand, the buffer manager may reallocate a page frame and un-map the page from the L2 pool to the L1 pool. The commitment phase of the L1 eviction may occur repeatedly (referring the circular flow between states 703 and 704 created by arrows 713 and 723) until the buffer pool manager evicts the page completely from the pool (reference transitions 722 or 723), depending on both virtual memory pressure and demand for the page.

L2 eviction removes the page completely from the buffer pool. The buffer pool manager 230 writes pages that are dirty with respect to external storage 250 back to external storage 250, and invalidates the page by clearing the BUF_L2BPOOL and BUF_L2DIRTY before unhashing the BUF structure and discarding it. L2 evictions free resources from cold pages and give them to warm pages. Downstream access to the page implies reading the page back from external storage. The buffer manager must be aggressive about freeing unneeded pages to moderate memory pressure and avoid unnecessary L2 evictions. As indicated by FIG. 7, L2 eviction is possible during allocation or at any of the two phases of L1 eviction.

Figure 8:
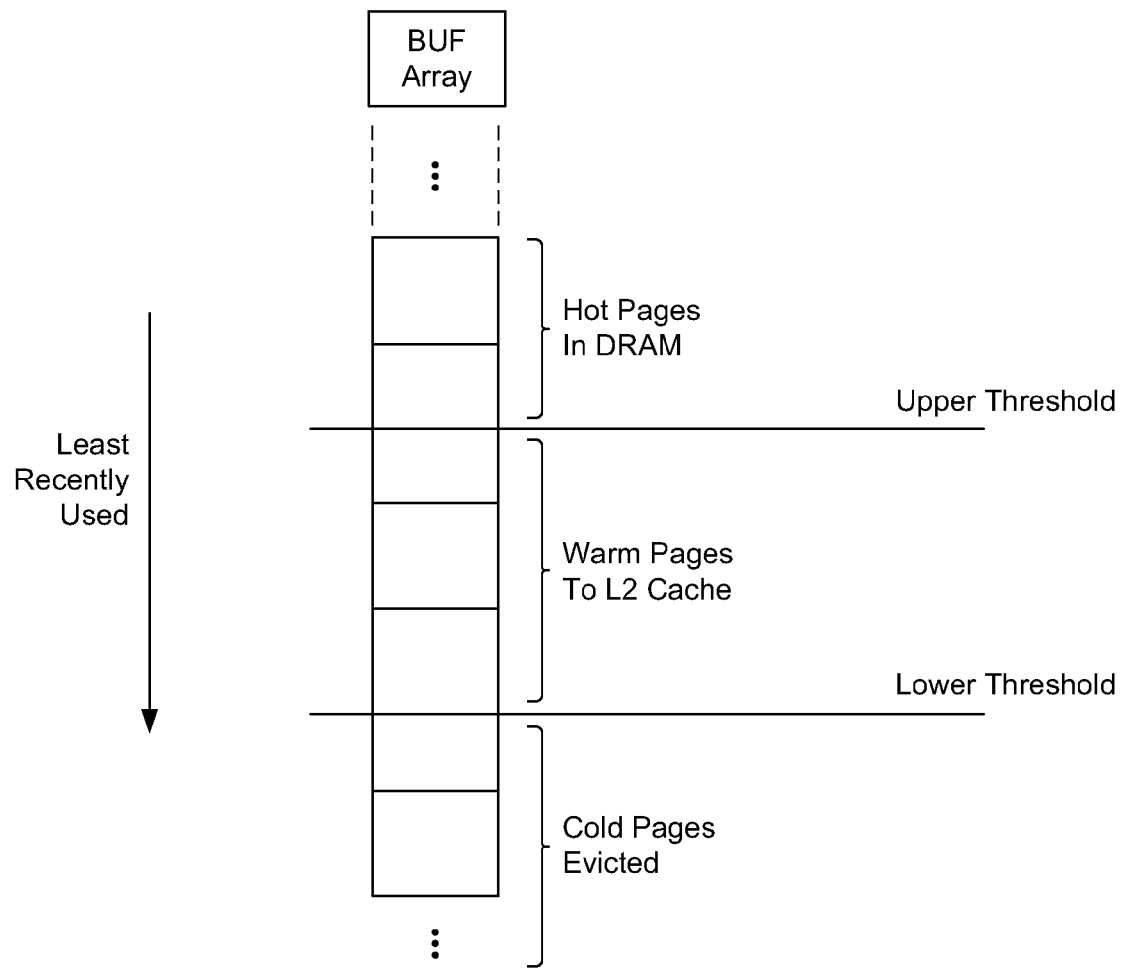
FIG. 8 illustrates a conceptual range of page or block temperatures.

The 2-level caching hierarchy divides database pages into three categories: (1) hot pages cached in the L1 buffer pool in DRAM, (2) warm pages cached in an L2 buffer pool paging file, (3) and cold database pages that are targeted for 2nd-level eviction to disk. The temperature is a measure of the time interval between the penultimate timestamp (the next-to-last-recently-used or NTLR value) of when the page was last referenced and the current time. The hotter the page, the smaller the interval between uses, or the higher the frequency of use. The colder the page, the larger the interval or the less recently used. FIG. 8 illustrates this segmentation of page temperatures.

The parameterized upper and lower thresholds may be defined statically and may be changed dynamically (e.g., using special trace flags, T-SQL DDL commands, or a public application programming interface). These thresholds may not change frequently and a few predefined ranges may be set depending on the workload. These thresholds are percentiles of page temperatures across all buffer pool pages. For example, a threshold interval of (10, 75) specifies a lower threshold of 10 and an upper threshold of 75. This means that all pages in the buffer pool with temperatures below that of the 10th percentile are considered cold, those with temperatures strictly above the 75th percentile are hot, and all other pages in between are considered warm.

A method calculates the temperatures corresponding to the threshold percentiles by randomly sampling the NTLR values of a statistically large number of pages in the buffer pool (the sample size is currently statically set to 500), sorting them in descending order, and selecting the temperatures at the 30th and 5th percentile to calculate the high and low threshold values, respectively. This method may grow the number of clean pages in the buffer pool. It does so by evicting warm pages out to the L2 buffer pool cache (i.e. pages between the L2 and L1 cutoff) if they are not clean relative to that cache. The method also evicts cold pages (i.e. pages older than the L1 cutoff) from the buffer pool completely. The method is called whenever the clock hand walking the BUF array (using the next method described herein) wraps the BUF array. Its parameters may include the current buffer partition, and an indicator of whether or not a steal is attempted by an allocation routine.

Another method uses the upper threshold temperature to determine which pages qualify for 1st-level eviction and the lower threshold to determine pages targeted for 2nd-level eviction. The method maintains the cursor mentioned in the method just previously described.

In one embodiment, one mechanism for consolidating random IOPS to be internal to the buffer pool, is to cache only clean pages in the L2 buffer pool. In this case, when completely evicting a clean page from the augmented buffer pool, the buffer manager does not need to write clean pages out to disk or force the log for the database. A workload generates random I/Os only when pages populate the buffer pool from disk and dirty pages are written back to disk eagerly under memory pressure, via for example the lazy writers. Writing only clean pages to the L2 pool biases the IOPS offload scheme toward read-only workloads. As the proportion of updates increase in the workload, the benefits of IOPS offload may be significant but much less resolute.

In the embodiment in which only clean pages are evicted to the L2 buffer pool, when a warm page that is also "disk-dirty" is to be evicted from the L1 buffer pool to the L2 buffer pull, that page is cleaned by writing the page to the disk, if possible, under a sequential write with other pages. In this description, a page is "disk dirty" (or simply "d-dirty") if the copy of the page in virtual memory has more recent updates than the logical image of the page in the database. Similarly, a page is L2 "pool dirty" (or "p-dirty") if the copy of the page in virtual memory has more recent updates than the most current image in the L2 buffer pool. Thus, in a dual write operation, the warm page is written to the L2 buffer pool, as well as to the disk, in parallel. This would ensure that the warm page is made clean in conjunction with its being written to the L2 buffer pool (if the page qualifies as "warm" and could be written to the L2 cache), under the assumption that both branches of the dual write operation are successful; that is, assuming that the page was successfully written to the disk as well as to the L2 buffer pool.

In the case where the page was not successfully written to the disk, but was successfully written to the L2 buffer pool, the page in the L2 buffer pool is invalidated (e.g., using the BUF_L2BPOOL bit in the BUF structure) to satisfy the criteria that only clean pages are to be written to the L2 buffer pool. In the case where the page was successfully written to the disk, but was not successfully written to the L2 buffer pool, the system does not validate that the page was written to the L2 buffer pool (e.g., using the BUF_L2BPOOL bit in the BUF structure), but the page is marked as clean (or not d-dirty).

A page is clean when it is equivalent to its database image on disk. When a page is updated in memory (in the L1 buffer pool), the page in the L1 buffer pool becomes dirty relative to its image on disk, and also the page is dirty relative to its image in the L2 buffer pool (if the page is present in the L2 buffer pool). There is a dirty status bit representing whether the page is disk dirty in the BUF descriptor. Accordingly, that bit would be set in this case. Furthermore, the BUF_L2DIRTY bit in the BUF descriptor represents whether the page is dirty with respect to its image in the L2 buffer pool (see FIG. 3), and thus that bit would also be set. When caching clean pages in the buffer pool, the manager maintains the invariant that no dirty pages are written to the L2 buffer pool. For clean pages already in the L2 buffer pool, setting the BUF_L2DIRTY status bit invalidates clean pages in the L2 buffer pool when the clean pages become dirty.

Lazy writes write dirty pages to disk. When these writes are completed successfully, the corresponding pages in memory are made clean again and are potential candidates for L2 buffer pool caching. The parallel dual write optimization allows the dirty candidate pages to be written to disk and the L2 buffer pool in parallel. The following outlines the algorithm:

1. Any dirty page being written to disk is selected for parallel writes if either of the two following criteria are satisfied:
   a. if the buffer pool cache (both L1 and L2) are not at capacity, or
   b. the page qualifies as a warm page as determined by the 1st-level eviction algorithm described above.

For all parallel dual write operations, the manager acquires a single I/O latch, incrementing the outstanding I/O count to two for the subsequent parallel write. Then, the asynchronous I/O's are submitted in parallel to both the disk I/O subsystem and the L2 buffer pool. On completion of each asynchronous write, the outstanding I/O count is decremented. If the write to disk completes successfully, the BUF_DIRTY status bit is reset to indicate the page is clean. Otherwise, the bit remains unchanged and the write I/O error is captured. The outstanding I/O count would decrement to zero upon the last completed write, allowing the manager to determine whether all writes were successful. If all writes were successful, the BUF_L2BPOOL status bit is set and the BUF_L2DIRTY status bit is reset to indicate a clean page in the buffer pool. If at least one of the writes was unsuccessful, then both BUF_L2BPOOL and BUF_L2DIRTY status bits remain unchanged and the appropriate write error is captured. Any write or I/O failures on the L2 buffer pool media disables the L2 buffer pool caching and the dual write operation. The I/O latch is then released.

Notice that one exclusive I/O latch is taken for all I/O's both to disk and the L2 buffer pool. This latch guarantees the stability of the page until completion of all I/O's. In addition, the atomicity guaranteed by the latch ensures only clean pages are written to the L2 buffer pool cache. If either the write to disk or the write to the L2 buffer pool fails, the BUF_L2BPOOL and BUF_L2DIRTY status bits are never updated to ensure any page still dirty in memory is not valid to the L2 buffer pool—maintaining the clean page L2 buffer pool invariant.

In the worst case, any failures to write a page out to disk results in a superfluous write to the L2 buffer pool. However, since write failures are very rare, this does not represent a significant problem. Finally, since the writes are submitted in parallel, the exclusive I/O latch is held for the duration of the slower of the two writes and not the aggregate of the two consecutive writes. This means the I/O latch is not held longer than that of any other I/O during forward progress and should have no significant impact on performance. Although this parallel dual write operation has been described with respect to parallel writes to disk and the L2 buffer pool, the principles may also apply to an extended buffer pool in which there are three or more levels in the buffer pool (e.g., for an L3 buffer pool up to an LM buffer pool where M is an integer equal to or greater than 3). In that case, there may be a parallel write operation in which a parallel write is made to the disk, and to the extended buffer pools using a single I/O latch as described above.

In a broader embodiment, the dirty pages may also be cached to the L2 buffer pool. These pages may contain updates that have not made it to disk or may be stale relative to a page in memory. For that reason, we introduce orthogonal notions of a page in the L1 pool being dirty with respect to the on disk database or relative to its most current image in the L2 pool.

To be clear, pages are dirty on disk or in the L2 pool relative to the page image in the L1 pool. There is no notion of dirtiness between pages in the on-disk database and the L2 pool. The following set of invariants specifies rules to determine the dirty states of a page during the two phases of L1 eviction and L2 eviction:

DI1. A newly allocated page is neither d-dirty nor p-dirty.

DI2. A page can become d-dirty, when there is an update to the page, at any point in time after allocation.

DI3. A page is never p-dirty on completion of a L1 eviction commitment phase. This means that the buffer manager has either to perform a L2 eviction or update the image of the page in the L2 pool. Without this invariant, the buffer manager will relinquish the virtual memory for a page and all updates to the L1 pool image are lost to the L2 pool. In this case, the updates were either completely lost or written to the on-disk database. This leads to the synchronization invariant below.

DI4. A page becomes p-dirty only if updated after the preparation phase of the L1 eviction.

DI5. A p-dirty page is always d-dirty but the converse is not necessarily true. This invariant ensures that the buffer manager either updates or invalidates any d-dirty page in the L2 buffer pool before it makes the on-disk image of the page clean. As a corollary, a d-dirty page in the L2 pool is always at least as recent as a p-dirty page on disk.

DI6. A page is neither d-dirty nor p-dirty on completion of a L2 eviction. This is the default invariant since a page cannot be clean or dirty if it is not in the buffer pool.

The current dirty page on existing BUF array elements captures the dirty state of a page. Augmenting the BUF array elements with one bit captures of the L2-dirty state of a page (reference FIG. 4 and the corresponding description above).

Moving Pages Between SCM and RAM

When moving pages between the L1 and L2 pools, the buffer manager may use an interface that abstracts out the nuances and idiosyncrasies of both the underlying media and their I/O characteristics. The un-map operation moves page frames from DRAM in the L1 pool to the L2 pool while the map operation moves pages from the L2 pool to page frames in the L1 pool. This section describes the mechanisms for realizing map and un-map operations for one specific type of SCM: NAND-flash SSDs. Other types of SCM, segmented shared, or network memory may have completely different implementations but honor the following contract:

MAP1. Pages are un-mapped and mapped atomically across the interface boundary.

MAP2. Un-map and map operations support boxcars of pages across the interface boundary with scatter and gather functionality for noncontiguous virtual memory page address segments.

MAP3. Semantics of un-map and map operations assume non-buffered DMA to and from the underlying SCM media.

MAP4. Both the un-map and map support both synchronous and asynchronous completion semantics.

SCMs have latencies closer approximating DRAM than disk and at first glance MAP2, MAP3 and MAP4 may appear unnecessary. MAP2 allows full exploitation of the underlying bus bandwidth for large bulk transfer of large groups of pages across the interface. The non-buffered DMA of MAP3 eliminates the injection of memory copy latency. Finally, MAP4 addresses a widening gap in the latency between on-core memory and memory at low tiers of the memory hierarchy. Furthermore, we do not want constraints on the latency of issuing un-map and map operations to limit the size of boxcars in MAP2.

Background L2 Indexing and Write to Disk

In the embodiment in which d-dirty pages are permitted in the L2 buffer pool, there may be a background indexer that sorts the d-dirty pages in the L2 buffer sequentially according to the disk address. These d-dirty pages are to be written to disk in order to clean up the L2 buffer pool. However, since sequential writes are much more efficient to write to disk than random access writes, the d-dirty pages should be written sequentially to disk if such sequences can be found. Clean pages may be sorted as well (according to the sequence) with the d-dirty pages.

The L2 buffer pool is then examined to find one or more sets of sequential contiguous dirty pages. These sequences may then be written to the disk more efficiently since 1) the sequences may be more easily found as they are already ordered sequentially in the L2 buffer pool, and 2) since the writes are all sequential writes. In one embodiment, in order to reduce the number of required sequential writes, the sequential write may include some clean pages as well. For instance, suppose that there is one sequence of 100 d-dirty pages, and another sequence of 100 d-dirty pages, with both sequences separated by a single clean page. Instead of performing two sequential writes of 100 d-dirty pages each, the system may instead perform a single write of 201 pages (200 of which being d-dirty, and 1 of which being clean). For disk write operations (or write operations to other media that favor sequential writes over random access writes), this may be a much more efficient way of writing 200 d-dirty pages, even though there was 1 clean page in the write that technically did not need to be written.

Figure 9:
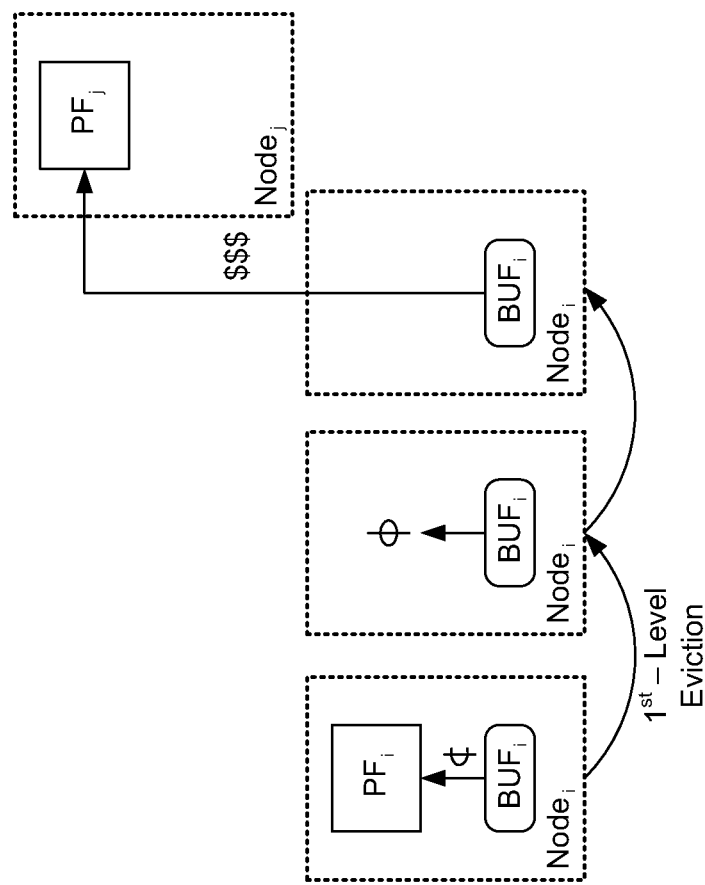
FIG. 9 illustrates a NUMA node mismatch between a BUF and its page frame that results in significant performance degradation on a running system with many pages.

Most of the NUMA logic remains the same in the buffer pool manager. This is made even simpler by the NUMA-aware memory manager making allocations and freeing from appropriate NUMA nodes transparent. However, after the commitment phase of a 1st-level eviction the BUF for a page loses its page frame. Whenever a page is faulted from the L2 to the L1 buffer pool cache the page frame may be allocated on the same node on which the BUF structure was allocated. The buffer pool manager typically references a page's BUF structure before accessing its page frame. So, a NUMA node mismatch between a BUF and its page frame results in significant performance degradation on a running system with millions of pages. FIG. 9 illustrates the challenge.

Figure 10:
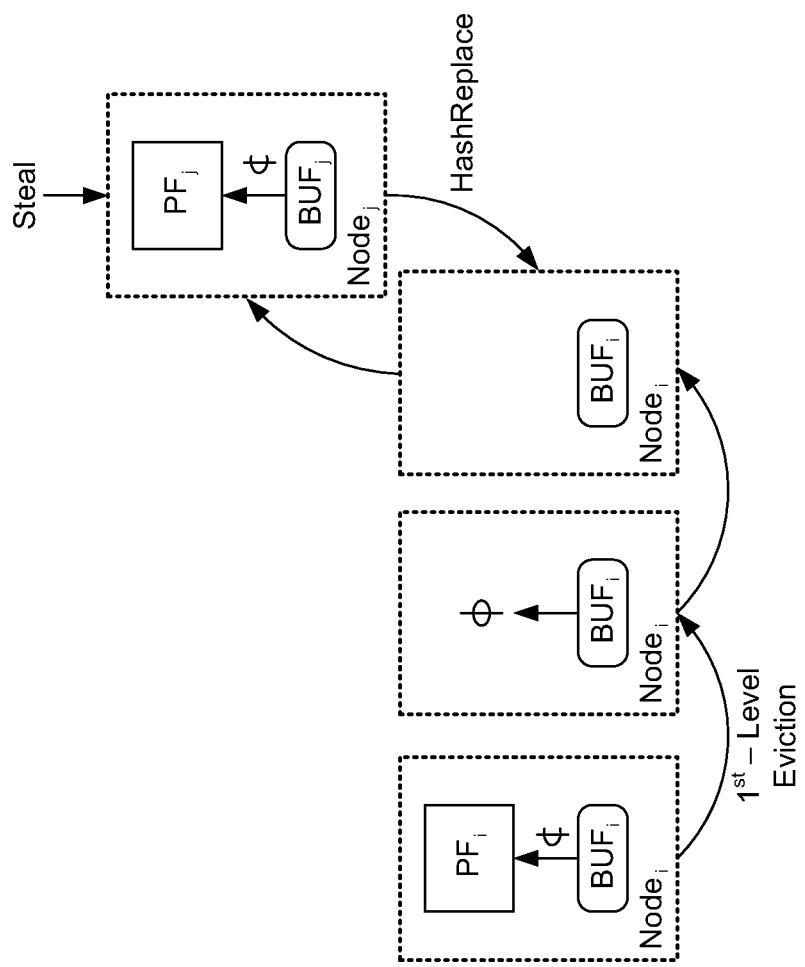
FIG. 10 illustrates a solution to the mismatch problem introduced in FIG. 9.

FIG. 10 illustrates a solution to this problem. When faulting a page in from the L2 to the L1 cache, the buffer pool manager allocates both a BUF and a page frame from the same node. If the node of the current BUF for the page matches that of the new page frame and BUF, the old BUF is linked to the new page frame and the new BUF is freed. If the memory nodes for the old and new BUFs do not match, the memory node of the page frame also does not match that of the old BUF. The contents of the old BUF are copied to the new BUF and the new BUF substituted for the old on the hash table.

Accordingly, the principles described herein enable the operations on large working block sets while reducing random access operations to external storage. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-storage devices, excluding propagation signals, which store computer-executable instructions that, when executed by one or more processors of a computing system, cause the computing system to implement a method for using a buffer pool to manage blocks of memory among a first level memory, a second level memory, and a lower level of external memory, and where the computer-implemented method comprises acts of:

retrieving from an external memory blocks of memory comprised of data pages, and caching at least some of said data pages in a first level memory of a buffer pool, and caching at least some other data pages in a second level memory of the buffer pool, the first level memory providing faster average access speeds for data retrieval than the second level memory, and the second level memory providing faster average access speeds for data retrieval than the external memory;

determining at least first and second threshold values, the first threshold value defining a value which determines when a data page is to be evicted from the first level memory of the buffer pool to the second level memory of the buffer pool, and the second threshold value defining a value which determines when a data page is to be evicted from the second level memory of the buffer pool;

periodically scanning all data pages cached in the first and second levels of memory of the buffer pool and assigning a value to each scanned data page based on usage history of each scanned page as of the time scanned;

periodically comparing the assigned value of each said cached data page to the first and second threshold values;

scheduling for eviction cached data pages from the first level memory of the buffer pool to the second level memory of the buffer pool for those cached data pages not having an assigned value above said first threshold level;

scheduling for eviction cached data pages from the second level memory of the buffer pool to a lower level memory for those cached data pages not having an assigned value above said second threshold level;

determining if a data page scheduled for eviction is dirty because the page has been altered prior to eviction, and if so, scheduling a write operation for writing the dirty data page to external memory prior to unhashing a buffer descriptor and freeing a page frame for the dirty data page so that the dirty page is then evicted;

for each data page scheduled for eviction that is dirty, writing the dirty page to external memory and after the scheduled write operation has been completed, evicting the dirty page from the first or second level of memory of the buffer pool based on the assigned value for the evicted dirty page as compared to the first and second threshold values; and for each data page scheduled for eviction that is not dirty, unhashing a buffer descriptor and freeing a page frame for each said data page that is not dirty, and evicting each such data page from the first or second level of memory of the buffer pool based on the assigned value of the evicted page that is not dirty, as compared to the first and second threshold values.

2. The computer program product of claim 1 where the computer system is comprised of a plurality of processors with at least one processor having multiple non-uniform memory access (NUMA) nodes, and wherein the computer-implemented method further comprises an act of partitioning the first level memory of the buffer pool among said nodes.

3. The computer program product of claim 1, wherein the first level memory of the buffer pool is dynamic random access memory (DRAM).

4. The computer program product of claim 1, wherein the second level memory of the buffer pool is storage class memory (SCM).

5. The computer program product of claim 1, wherein the second level memory of the buffer is at least one solid state disk.

6. The computer program product of claim 1, wherein the lower level memory is the external memory.

7. The computer program product of claim 1, wherein the lower level memory is a disk.

8. The computer program product of claim 1, wherein in addition to completing the scheduled write operation of the dirty page to external memory, the computer-implemented method further comprises an act of performing a further, parallel write of the dirty page to the second level memory of the buffer pool.

9. A computer-implemented method for using a buffer pool to manage blocks of memory among a first level memory, a second level memory, and a lower level of memory, the computer-implemented method comprising acts of:

retrieving from an external memory blocks of memory comprised of data pages, and caching at least some of said data pages in a first level memory of a buffer pool, and caching at least some other data pages in a second level memory of the buffer pool, the first level memory providing faster average access speeds for data retrieval than the second level memory, and the second level memory providing faster average access speeds for data retrieval than the external memory;

determining at least first and second threshold values, the first threshold value defining a value which determines when a data page is to be evicted from the first level memory of the buffer pool to the second level memory of the buffer pool, and the second threshold value defining a value which determines when a data page is to be evicted from the second level memory of the buffer pool;

periodically scanning all data pages cached in the first and second levels of memory of the buffer pool and assigning a value to each scanned data page based on usage history of each scanned page as of the time scanned;

periodically comparing the assigned value of each said cached data page to the first and second threshold values;

scheduling for eviction cached data pages from the first level memory of the buffer pool to the second level memory of the buffer pool for those cached data pages not having an assigned value above said first threshold level;

scheduling for eviction cached data pages from the second level memory of the buffer pool to a lower level memory of the buffer for those cached data pages not having an assigned value above said second threshold level;

determining if a data page scheduled for eviction is dirty because it has been altered prior to eviction, and if so, scheduling a write operation for writing the dirty data page to external memory prior to unhashing a buffer descriptor and freeing a page frame for the dirty data page so that the dirty page is then evicted;

for each data page scheduled for eviction that is dirty, after scheduled write operation has been completed, evicting the dirty page from the first or second level of memory of the buffer pool based on the assigned value of that page as compared to the first and second threshold values; and for each data page scheduled for eviction that is not dirty, unhashing a buffer descriptor and freeing a page frame for each said data page that is not dirty, and evicting each such data page from the first or second level of memory of the buffer pool based on the assigned value of that page as compared to the first and second threshold values.

10. The computer-implemented method of claim 9 further comprising an act of partitioning the first level memory of the buffer pool among multiple non-uniform memory access (NUMA) nodes of at least one processor.

11. The computer-implemented method of claim 9 wherein in addition to completing the scheduled write operation of the dirty page to external memory, the computer-implemented method further comprises an act of performing a further, parallel write of the dirty page to the second level memory of the buffer pool.

12. The computer-implemented method of claim 9 wherein the lower level memory is the external memory.

13. The computer-implemented method of claim 9, wherein the lower level is
a third level memory of the buffer pool, and wherein the computer-implemented method further comprises acts of:
determining a third threshold value defining a value which determines when a data page is to be evicted from the third level memory of the buffer pool to a further lower level memory if a data page is assigned a value that is below the third threshold value; and
scheduling for eviction cached data pages from the third level memory of the buffer pool to the further lower level memory for those cached data pages not having an assigned value above said third threshold value.

14. The computer-implemented method of claim 9, wherein the first level memory of the buffer pool is dynamic random access memory (DRAM).

15. The computer-implemented method of claim 9, wherein the second level memory of the buffer pool is storage class memory (SCM).

16. The computer-implemented method of claim 15, wherein the second level memory of the buffer is at least one solid state disk.

17. A computer system comprising:
one or more processors;
a lower level of external memory for storage of memory blocks comprising one or more data pages;
a buffer pool comprised of a first level memory and a second level memory, the first level memory providing faster average access speeds for data retrieval than the second level memory, and the second level memory providing faster average access speeds for data retrieval than the external memory; and
one or more computer-storage devices which store computer-executable instructions that, when executed by one or more processors of a computing system, cause the computer system to implement a method for using the buffer pool to manage blocks of memory among the first level memory, the second level memory, and the lower level of external memory, and where the computer-implemented method comprises acts of:
retrieving from the external memory blocks of memory comprised of data pages, and caching at least some of said data pages in the first level memory of a buffer pool, and caching at least some other data pages in the second level memory of the buffer pool;
determining at least first and second threshold values, the first threshold value defining a value which determines when a data page is to be evicted from the first level memory of the buffer pool to the second level memory of the buffer pool, and the second threshold value defining a value which determines when a data page is to be evicted from the second level memory of the buffer pool;
periodically scanning all data pages cached in the first and second levels of memory of the buffer pool and assigning a value to each scanned data page based on usage history of each scanned page as of the time scanned;
periodically comparing the assigned value of each said cached data page to the first and second threshold values;
scheduling for eviction cached data pages from the first level memory of the buffer pool to the second level memory of the buffer pool for those cached data pages not having an assigned value above said first threshold level;
scheduling for eviction cached data pages from the second level memory of the buffer pool to a lower level memory of the buffer for those cached data pages not having an assigned value above said second threshold level;
determining if a data page scheduled for eviction is dirty because the pate has been altered prior to eviction, and if so, scheduling a write operation for writing the dirty data page to external memory prior to unhashing a buffer descriptor and freeing a page frame for the dirty data page so that the dirty page is then evicted;
for each data page scheduled for eviction that is dirty, after the scheduled write operation has been completed, evicting the dirty page from the first or second level of memory of the buffer pool based on the assigned value for that page as compared to the first and second threshold values; and
for each data page scheduled for eviction that is not dirty, unhashing a buffer descriptor and freeing a page frame for each said data page that is not dirty, and evicting each such data page from the first or second level of memory of the buffer pool based on the assigned value for that page as compared to the first and second threshold values.

18. The computer system of claim 17, wherein the buffer pool has a third level memory, and wherein the computer-implemented method further comprises acts of:
determining a third threshold value defining a value which determines when a data page is to be evicted from the third level memory of the buffer pool to a the lower level memory if a data page is assigned a value that is below the third threshold value; and
scheduling for eviction cached data pages from the third level memory of the buffer pool to the lower level memory for those cached data pages not having an assigned value above said third threshold value.

* * * * *